Patented Feb. 22, 1949

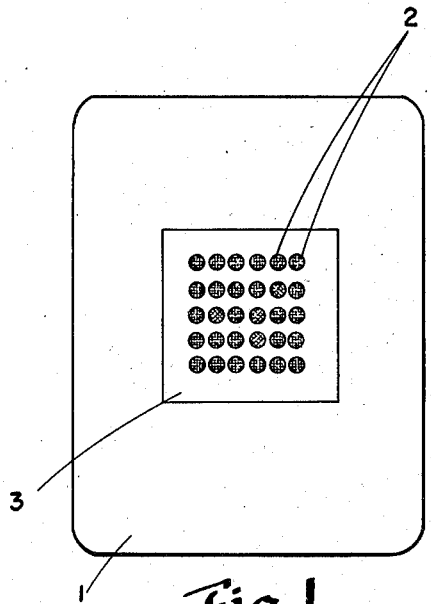
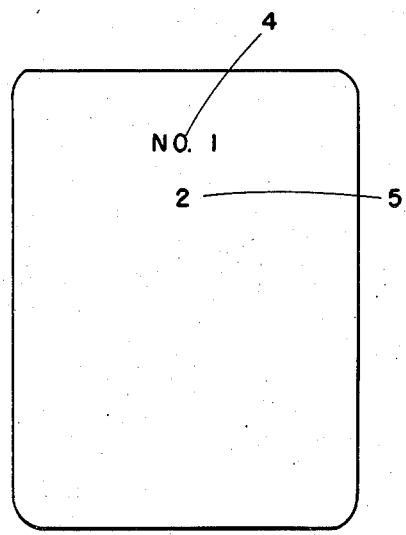
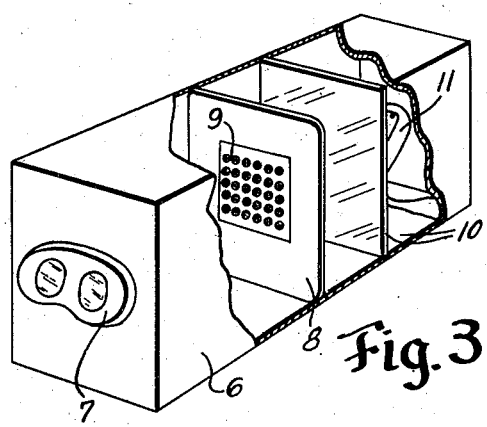
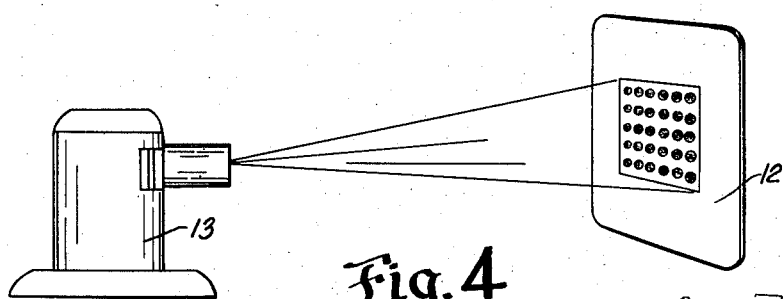

2,462,485

UNITED STATES PATENT OFFICE 2,462,485

MEANS FOR TESTING COLOR VISION

Ellis Freeman, Sarasota, Fla.

Application February 7, 1946, Serial No. 646,123

2 Claims. (Cl. 88—20)

This invention comprises novel means of testing the sensitivity of color discrimination of a person.

One of the principal objects of the invention is to provide means of testing which shall be accurate and also dependable despite variations in illumination varying from low to high color temperatures.

For accomplishing this object the invention provides polychromatic test plates, each plate embodying a plurality of chromatic spots, arranged in a separate group, the spots of one color being distinguishable from the spots of another color within any given group, despite variations in illumination, if viewed by the color-competent, and undistinguishable if viewed by the color deficient.

Another object is to provide test means of the above character which may be opaque or transparent.

Another object is to provide test means of the above character from which an illuminant may be reflected or through which it may be transmitted to the observer directly or by opaque or transparent projection on a screen.

Another object is to provide test means of the above character which may be presented to a single observer or simultaneously to a group of observers.

Another object is to provide test means of the above character consisting of inks, pigments, dyes, or other colorants which possess the physical characteristics required for maintaining the dependability and diagnostic integrity of the test despite variations in illuminant ranging from low to high color temperatures.

Other objects and advantages of the invention will become apparent from the following description taken in connection with the accompanying drawings and it will be apparent that changes may be made in the selection of specific colorants, details of construction, arrangement of parts, and steps of the method shown and described without departing from the spirit of the invention as expressed in the accompanying claims. I therefore do not wish to be limited to the exact details of construction, arrangement of parts, and methods shown and described or to the specific composition or physical characteristics of the colorants, as the case may have been given only by way of illustration.

The provision of polychromatic plates for determining color sensitivity is not new in the art. However all such plates have hitherto been valid only with a predetermined illuminant of specific color temperature. But the effective illumination which falls on such plates is bound to vary, and impair the results of the test. Where natural daylight is specified, it is known that this varies uncontrollably between wide extremes of color temperature. Where artificial daylight from electric house current is specified, it is known that this will vary considerably in color temperature on account of changes in line voltage which obviously vary the current during various hours of the day according to its quantity-usage in the building. Reflection from colored walls will also introduce uncontrolled and considerable variations in color temperature. Moreover, those who administer the test are generally unaware of or indifferent to the requirement of an illuminant of specific color temperature, nor can they generally control the illumination of the testing environment if they would.

Two reasons govern the requirement of a specific illuminant as a condition for using all prior polychromatic plates:

1. Only by such means can the colors of any one such plate all be retained within the same confusion zone of the Chromaticity Diagram as known in this art and as described particularly in pages 9 and 10 in the Handbook of Colorimetry prepared and issued by the Massachusetts Institute of Technology (1936) generally recognized in this art as standard; and such retention is a necessity for valid testing.

2. Only by such means can the brightness of the colors of any one such plate be maintained approximately equal among themselves, and such equality is a necessity for valid testing.

In consequence such prior tests have been undependable and frequently erroneous in results as a consequence of variations in illumination.

The present invention is, therefore, directed particularly to the provision of colorants which, despite variations in illumination, shall in the case of each plate:

1. Occupy the same confusion zone of the Chromaticity Diagram. The colorants may, when the illuminant is changed, shift to another confusion zone, but they will all shift together and not become scattered among two or more confusion zones.

2. Be of equal brightness among themselves. The colorants may, when the illuminant is changed, shift to another level of brightness, but they will all shift together and not change their brightness relative to one another.

The accomplishment of the above provision of colorants and the essence of this invention lies in selecting and combining on a plate practicable colorants which have the following physical characteristics under Illuminant C which is the illuminant described in the Handbook of Colorimetry of the Massachusetts Institute of Technology heretofore mentioned as recognized by this art as a standard, and designated as Illuminant C on page 16 thereof, which Illuminant C was in 1931 adopted, defined and named as such by the International Committee on Illumination.

1. Lie within the spectral range between 517 and 670 millimicrons in dominant wavelength.
2. Have equal purity, so that they lie on a line approximately parallel to the spectral locus of the Chromaticity Diagram.
3. Have equal brightness.
4. Have maximal purity compatible with 1, 2, and 3 immediately above.
5. Differ from one another, when placed serially, by approximately three millimicrons in dominant wavelength.

The following table gives an illustrative and typical series of practicable colorants meeting the requirements enumerated above. These colorants are identified in terms of the following standard I. C. I. specifications meaning the definitive standards adopted in 1931 by the aforesaid International Committee on Illumination.

Table

| Dominant Wavelength | Percentage Purity | Percentage Brightness |
| --- | --- | --- |
| 575 | 73 | 42 |
| 578 | 73 | 42 |
| 581 | 73 | 42 |
| 584 | 73 | 42 |
| 587 | 73 | 42 |
| 590 | 73 | 42 |

If the reflectances of the colorants in the table be integrated with the tristimulus values for the equal energy spectrum weighted for the relative energy distribution of any given illuminant, the consequent dominant wavelength of each colorant in the table will lie within the specified spectral range between 517 and 670 millimicrons wavelength; all the colorants will be of equal purity; all will be of equal brightness; and all will be separated by the specified wavelength interval.

It is to be understood that groups of colorants of similar relationships and embodying the same general principles may be employed for the same purpose.

Referring to the drawings:

Fig. I is a face view of a typical card type test means embodying the present invention;

Fig. II is a rear view of said test means;

Fig. III is a diagrammatic perspective view shown partially in section of a modified form of a test device embodying the invention; and Fig. IV is a diagrammatic view of a further modified arrangement of test means embodying the invention.

Referring more particularly to the drawings wherein like characters of reference designate like parts throughout the several views, the test means of Fig. I comprises a plurality of test plates each in the form of a card 1 having a plurality of colored spots 2 formed on a white background 3 which in turn is placed on a black background which latter background constitutes the front surface of the card 1. The charts or plates embodying the above construction are formed of two or more different colors, and these colors are discriminated one from the other by the normal subject, but not by the abnormal. In forming the respective charts, the spots are preferably arranged in horizontal rows, as shown in Fig. I, with the horizontal space between the spots being less than the vertical space between spots. This spacing is to facilitate ease of scanning.

The test is carried out by exhibiting the plates to the individual in random order to prevent intrusion of possible error due to a subject, who may have seen the charts before, knowing or guessing what spots are being used to test his vision. On the back of each plate or chart, as shown in Fig. II, there is provided an identifying designation, such as illustrated at 4 and a designation 5 indicating the correct response or answer, which response or answer represents the number of spots which are of a different color from that of the majority. This identifying number 4 and the answer number 5 are provided on the back and out of view of the subject to prevent cheating and also to enable a person who is himself color-blind to administer the test and record the results correctly.

The test plates may be either opaque or transparent, and presented to the subject either by light shining upon said apaque surface or light shining through said transparency or may be projected. In Figure III I have shown a display device consisting of a compartmental casing 6, provided with an eye-piece 7 at front. A central transverse partition 8 is installed at appropriate distance from the eye-piece, and is orificed to receive a transparency 9, provided with the dichromatic or poly-chromatic spots colored according to my invention as hereinbefore described. Rearward of this partition 8 is a transparent partition or light screen 10, behind which is a light-source 11, such as Illuminant C previously defined. In Figure IV, I have shown diagrammatically, means for displaying the colorants in similar arrangement by projection upon a screen 12, by means of a light-source or projector 13, disposed at a proper distance from said screen 12, which is supported by any suitable means, not shown.

Any other modified or equivalent display device may be employed as desired. My discovery, and my invention, in no way depend upon what particular form of display means is used.

What is essential to its successful employment as an unfailing, dependable means of testing color-vision-discrimination is that the two or more colorants prepared and displayed upon the test plate or transparency, shall be selected according to the description and directions hereinbefore set forth, namely, that they shall be colorants falling within the stated spectral range between 517 and 670 millimicrons in dominant wave-lengths as hereinbefore set forth and preferably of nearly adjacent wave-lengths relatively to one another, such as suggested in the table herein, have equal purity so that they lie on a line approximately parallel to the spectral locus of the Chromaticity Diagram of the said Handbook of Colorimetry, have equal brightness, have preferably maximal purity compatible with the foregoing conditions and which preferably differ from one another when placed serially, by approximately three millimicrons in dominant wave length.

If test plates are prepared thus, under Illuminant C, and presented to the subject as described, my invention assures that these colorants upon the plates will provide an absolutely accurate test of color-vision, which will I believe completely eliminate all the errors recited in the preamble of this specification, and which will particularly be independent of variations in the illumination; that even if the variation be such that the colorants shift to another confusion zone, they will all shift together and into a common confusion zone, leaving them still effective as before in being indistinguishable by the colorvision-defectives, while distinguishable by the color-vision-competent; and despite such variation in illuminant, will remain of equal brightness among themselves.

By reference to said table given in this specification hereinbefore, it will be noted that I have specified as exemplary six colorants of quite nearly adjacent dominant wave-lengths, from 575 millimicrons to 590 millimicrons, with three millimicrons' difference serially. It is customary in preparing the test-plates to select one colorant for the majority of the spots upon a given plate, and interplace among the rows of such spots two or more spots of a differing colorant, the distinguishment of which from the majority constitutes the test showing color-vision-competence. The table is informative, and represents a highly successful embodiment, but is not delimiting as to other combinations of colorants, especially within the spectral range 517 to 670 indicated.

It is within this spectral range of colorants and under the other conditions defined herein, that there can always and surely be obtained the results hereinabove outlined, and the maintenance of test-integrity, including equal brightness and equal purity, be achieved despite such wide variation in the illuminant from low color temperature to high color temperature. Such variations of color temperature of the illuminant which usually occur wholly without and beyond any control by the operator of the test, often without his knowledge or perception, may frequently include some concomitant variation in the intensity of the illumination, and such variation in intensity which diminishes the brightness of the respective colors, will leave them nevertheless of equal brightness among themselves, if they are prepared and selected and displayed according to my invention, so long, of course, as the intensity of the illuminant remains sufficient to enable the detection of hue differences between colors in general which obviously would be a pre-requisite to any color vision testing whatever.

In describing my invention to the fullest extent of its details and exactness of preparation or selection of the colorants, I have aimed to convey all possible information respecting the same, in its present preferred embodiment thereof, I am aware that minor variations in and from my directions might conceivably produce a test-plate which within some greater or lesser degree of certainty or dependability, or under some favorable conditions might approximate the high result I have achieved or simulate the same. I am aware that my preferred use of colorants of nearly adjacent dominant wave-lengths of approximately three millimicrons apart, serially, as stated may be varied slightly. I regard as falling within the scope and purview of my invention all modifications which, while varying in some minor specific concrete detail, are identical in preserving all the characteristics and relations to and with one another and operate together as a unit of equivalent factors, equivalently related and operating in equivalent manner to the production of an equivalent or identical result.

Having described my invention, I claim:

1. A chart-device for testing color vision, of the class of polychromatic plates marked with colors which are distinguishable apart by the color-competent and indistinguishable by the color-defective in the same illuminant in which said colors were selected for the plates; which consists of one or more plates having a test display surface on which are applied color patches which fall within a spectral range of 517 and 670, in dominant wave-lengths, and within said range are all colors which differ from each other by approximately three millimicrons in dominant wave-lengths, and only such colors as so differ serially and which are—under Illuminant C (6500 degrees Kelvin)—of equal brightness among themselves, and of equal purity among themselves, and are each and all of maximal purity consistent with that equality of purity among themselves, and with that equality of brightness among themselves; whereby when such a test plate on which the colors are all as so specified, is presented to a subject for test under an illuminant which varies in color temperature from that of the said Illuminant C in which the test plate colors were selected, the said color patches will still remain of such equal purity and equal brightness and still remain distinguishable by the color-competent and undistinguishable by the color-defective, despite said variation in color temperature of the illuminant.

2. A chart-device for testing color vision, of the class of polychromatic plates marked with colors which are distinguishable apart by the color-competent and indistinguishable by the color-defective under the same illuminant in which said colors were selected for the plates; which consists of one or more plates having a test display surface on which are applied color patches of the whole series of colors in the spectral range between 575 to 590 in dominant wave-lengths which differ from each other by approximately three millimicrons of dominant wave-lengths serially, and which are—under Illuminant C (6500 degrees Kelvin)—of equal brightness among themselves, and of equal purity among themselves, and are each and all of maximal purity consistent with that equality of purity among themselves and with that equality of brightness among themselves; whereby when such color vision test plates on which the colors are all as so specified, is presented to a subject for test under an illuminant which varies in color temperature from that of the said Illuminant C under which the test plate colors were selected, the said color patches will still remain of such equal purity and such equal brightness and still remain distinguishable by the color-competent and indistinguishable by the color-defective, despite such variation in color temperature of the illuminant.

ELLIS FREEMAN.

REFERENCES CITED

The following references are of record in the file of this patent:

UNITED STATES PATENTS

| Number | Name | Date |
|---|---|---|
| 1,658,356 | Schaaff | Feb. 7, 1928 |
| 1,973,966 | Tillyer | Sept. 18, 1934 |

OTHER REFERENCES

Tscherning Text, "Physiologic Optics," 1924; Keystone Publishing Co., Philadelphia; pages 284, 285, 293 and 325.

Nickerson et al.: Article in Journal of the Optical Society of America, vol. 30, Apr. 1940, pages 159–162.